(12) United States Patent
Zaikov (10) Patent No.: US 10,525,678 B2
(45) Date of Patent: Jan. 7, 2020

(54) SHRINK FILM FOR LABEL (71) Applicant: Avery Dennison Corporation, Pasadena, CA (US)

(72) Inventor: Vadim Zaikov, Perry, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/650,527

(22) Filed: Oct. 12, 2012

(65) Prior Publication Data

US 2013/0095371 A1 Apr. 18, 2013

Related U.S. Application Data

(60) Provisional application No. 61/547,464, filed on Oct. 14, 2011.

(51) Int. Cl.
*B32B 27/08* (2006.01)
*B32B 27/18* (2006.01)
(Continued)

(52) U.S. Cl.
CPC .............. *B32B 27/08* (2013.01); *B32B 7/00* (2013.01); *B32B 27/18* (2013.01); *B32B 27/20* (2013.01); *B32B 27/32* (2013.01); *B32B 27/36* (2013.01); *B32B 2250/03* (2013.01); *B32B 2250/04* (2013.01); *B32B 2250/244* (2013.01); *B32B 2250/40* (2013.01); *B32B 2307/732* (2013.01); *B32B 2307/736* (2013.01); *B32B 2307/746* (2013.01); *B32B 2323/00* (2013.01); *B32B 2367/00* (2013.01); *B32B 2457/10* (2013.01); *C08G 63/02* (2013.01); *C08G 63/12* (2013.01); *C08G 63/123* (2013.01); *C08G 63/127* (2013.01); *C08G 63/16* (2013.01); *C08G 63/18* (2013.01); *C08G 63/181* (2013.01); *C08G 63/183* (2013.01); *C08G 63/185* (2013.01); *C08G 63/187* (2013.01); *C08G 63/189* (2013.01); *C08G 63/199* (2013.01);
(Continued)

(58) Field of Classification Search
None
See application file for complete search history.

(56) References Cited

U.S. PATENT DOCUMENTS 3,113,986 A 12/1963 Breslow
3,239,478 A 3/1966 Harlan, Jr.
(Continued)

FOREIGN PATENT DOCUMENTS

CN 1578805 2/2005
CN 101084116 12/2007
(Continued)

OTHER PUBLICATIONS

Whelan, Tony, Polymer Technology Dictionary (1994), p. 566.*
(Continued)

*Primary Examiner* — Vivian Chen (57) ABSTRACT

A shrink film comprising a core layer comprising a glycol modified polyester, the core having an upper and lower surface; an upper skin layer disposed on the upper surface of the core layer and a lower skin layer disposed on the lower surface of the core layer, the skin layers each individually comprising (a) a resin material; and (b) an antiblocking agent.

24 Claims, 1 Drawing Sheet

(51) Int. Cl.

| | | |
|---|---|---|
| *B32B 27/36* | (2006.01) | |
| *B32B 27/20* | (2006.01) | |
| *B32B 27/32* | (2006.01) | |
| *B32B 7/00* | (2019.01) | |
| *C08L 67/03* | (2006.01) | |
| *C08L 67/04* | (2006.01) | |
| *C08L 67/02* | (2006.01) | |
| *C08K 3/01* | (2018.01) | |
| *C08K 3/22* | (2006.01) | |
| *C08K 3/013* | (2018.01) | |
| *C08K 3/34* | (2006.01) | |
| *C08K 3/20* | (2006.01) | |
| *C08K 3/40* | (2006.01) | |
| *C08K 3/36* | (2006.01) | |
| *C08G 63/12* | (2006.01) | |
| *C08G 63/185* | (2006.01) | |
| *C08G 63/18* | (2006.01) | |
| *C08G 63/183* | (2006.01) | |
| *C08G 63/181* | (2006.01) | |
| *C08G 63/16* | (2006.01) | |
| *C08G 63/187* | (2006.01) | |
| *C08G 63/199* | (2006.01) | |
| *C08G 63/127* | (2006.01) | |
| *C08G 63/189* | (2006.01) | |
| *C08G 63/123* | (2006.01) | |
| *C08G 63/02* | (2006.01) | |
| *H01M 2/02* | (2006.01) | |

(52) U.S. Cl.
CPC ............... *C08K 3/01* (2018.01); *C08K 3/013* (2018.01); *C08K 3/20* (2013.01); *C08K 3/22* (2013.01); *C08K 3/34* (2013.01); *C08K 3/346* (2013.01); *C08K 3/36* (2013.01); *C08K 3/40* (2013.01); *C08K 2201/015* (2013.01); *C08L 67/02* (2013.01); *C08L 67/03* (2013.01); *C08L 67/04* (2013.01); *H01M 2/02* (2013.01); *Y10T 428/1328* (2015.01); *Y10T 428/239* (2015.01); *Y10T 428/2495* (2015.01); *Y10T 428/24802* (2015.01); *Y10T 428/28* (2015.01); *Y10T 428/2848* (2015.01); *Y10T 428/31786* (2015.04); *Y10T 428/31797* (2015.04)

(56) References Cited

U.S. PATENT DOCUMENTS

| | | | |
|---|---|---|---|
| 3,251,905 A | 5/1966 | Zelinski | |
| 3,390,207 A | 6/1968 | Moss | |
| 3,598,887 A | 8/1971 | Darcy | |
| 3,639,521 A | 2/1972 | Hsieh | |
| 3,718,495 A * | 2/1973 | Tomita | C09J 7/0264 427/208.4 |
| 4,188,443 A * | 2/1980 | Mueller | B29C 55/023 428/216 |
| 4,208,356 A | 6/1980 | Fukawa et al. | |
| 4,219,627 A | 8/1980 | Halasa et al. | |
| 4,226,952 A | 10/1980 | Halasa et al. | |
| 4,375,494 A * | 3/1983 | Stokes | 428/323 |
| 4,879,177 A * | 11/1989 | Boice | B29C 55/023 428/339 |
| 4,938,683 A * | 7/1990 | Boice | B29C 55/023 428/517 |
| 5,023,143 A * | 6/1991 | Nelson | B32B 7/02 428/516 |
| 5,164,444 A | 11/1992 | Bernard | |
| 5,171,625 A * | 12/1992 | Newton | B32B 27/36 428/195.1 |
| 5,190,609 A | 3/1993 | Lin et al. | |
| 5,232,958 A | 8/1993 | Mallya et al. | |
| 5,264,532 A | 11/1993 | Bernard | |
| 5,292,566 A | 3/1994 | Shacklett, III | |
| 5,358,804 A | 10/1994 | Will et al. | |
| 5,435,936 A | 7/1995 | Broze | |
| 5,460,861 A | 10/1995 | Vicik et al. | |
| 5,534,570 A * | 7/1996 | Shih et al. | 524/114 |
| 5,623,011 A | 4/1997 | Bernard | |
| 5,705,551 A | 1/1998 | Sasaki et al. | |
| 5,709,937 A | 1/1998 | Adams et al. | |
| 5,741,563 A | 4/1998 | Mehta et al. | |
| 5,747,192 A * | 5/1998 | Hughen | G09F 3/04 156/85 |
| 5,824,398 A * | 10/1998 | Shih | C08K 5/103 428/195.1 |
| 5,859,116 A * | 1/1999 | Shih | 524/493 |
| 5,910,370 A * | 6/1999 | Katsura | C08J 7/04 428/352 |
| 6,306,982 B1 | 10/2001 | Lee et al. | |
| 6,362,306 B1 * | 3/2002 | Shelby | C08G 63/199 264/175 |
| 6,368,724 B1 * | 4/2002 | Fagerburg | C08K 5/3475 428/480 |
| 6,436,496 B1 | 8/2002 | Rackovan et al. | |
| 6,514,583 B1 | 2/2003 | Ahlgren et al. | |
| 6,623,821 B1 * | 9/2003 | Kendig | B32B 7/12 428/34.9 |
| 8,911,839 B2 * | 12/2014 | Ito | B32B 27/36 428/323 |
| 2002/0090502 A1 * | 7/2002 | Ito | B32B 1/08 428/304.4 |
| 2002/0098303 A1 | 7/2002 | Rackovan et al. | |
| 2002/0186120 A1 * | 12/2002 | Tamura et al. | 338/22 R |
| 2003/0039775 A1 * | 2/2003 | Kong | B32B 27/36 428/34.9 |
| 2003/0068453 A1 * | 4/2003 | Kong | B32B 27/32 428/35.2 |
| 2003/0088033 A1 * | 5/2003 | Shelby et al. | 525/444 |
| 2003/0165671 A1 * | 9/2003 | Hashimoto | B29C 55/12 428/304.4 |
| 2003/0170427 A1 * | 9/2003 | Ito et al. | 428/156 |
| 2004/0052993 A1 * | 3/2004 | Dawes | B32B 27/36 428/35.7 |
| 2004/0096681 A1 * | 5/2004 | Lee | C08J 7/047 428/480 |
| 2004/0115456 A1 | 6/2004 | Kanderski et al. | |
| 2004/0185235 A1 * | 9/2004 | Emery | G09F 3/04 428/204 |
| 2004/0265607 A1 * | 12/2004 | Lee | C08J 7/047 428/480 |
| 2005/0010018 A1 * | 1/2005 | Kim | C08G 63/199 528/307 |
| 2005/0106342 A1 * | 5/2005 | Dawes | B32B 7/02 428/34.9 |
| 2005/0191439 A1 * | 9/2005 | Hirose | B41M 7/0081 428/32.1 |
| 2005/0199359 A1 * | 9/2005 | Furuheim | 162/135 |
| 2006/0019112 A1 | 1/2006 | Holmes et al. | |
| 2006/0063008 A1 * | 3/2006 | Inagaki et al. | 428/423.1 |
| 2006/0121219 A1 * | 6/2006 | Shelby et al. | 428/34.9 |
| 2006/0222874 A1 * | 10/2006 | Umeda | B32B 7/10 428/483 |
| 2006/0228503 A1 | 10/2006 | Havens et al. | |
| 2007/0003774 A1 * | 1/2007 | McDaniel | B29C 61/003 428/480 |
| 2007/0071967 A1 * | 3/2007 | Inagaki | B29C 61/003 428/341 |
| 2007/0099017 A1 * | 5/2007 | Hayakawa et al. | 428/480 |
| 2007/0196600 A1 * | 8/2007 | Hutchinson et al. | 428/34.1 |
| 2007/0255013 A1 * | 11/2007 | Becraft | C08L 67/04 525/418 |
| 2008/0050651 A1 | 2/2008 | Wakai et al. | |
| 2009/0011263 A1 | 1/2009 | Forloni | |
| 2009/0017245 A1 * | 1/2009 | Forloni | B29C 55/023 428/35.7 |
| 2009/0038736 A1 * | 2/2009 | Lorence | B32B 27/32 156/86 |

(56) References Cited

U.S. PATENT DOCUMENTS

| | | | |
|---|---|---|---|
| 2009/0038737 A1* | 2/2009 | Previty | B32B 1/02 |
| | | | 156/86 |
| 2009/0042024 A1* | 2/2009 | Fujii et al. | 428/336 |
| 2009/0068486 A1 | 3/2009 | Blackwell et al. | |
| 2009/0162630 A1* | 6/2009 | Shin | C08J 5/18 |
| | | | 428/220 |
| 2009/0202758 A1* | 8/2009 | Hiruma | B29C 61/003 |
| | | | 428/34.9 |
| 2009/0227735 A1 | 9/2009 | Shih et al. | |
| 2009/0291284 A1 | 11/2009 | Frauenhofer et al. | |
| 2010/0068355 A1* | 3/2010 | Berry | B32B 1/02 |
| | | | 426/125 |
| 2010/0112263 A1* | 5/2010 | Lorence et al. | 428/41.8 |
| 2010/0224529 A1* | 9/2010 | Forloni | B29C 55/023 |
| | | | 206/524.1 |
| 2010/0227136 A1* | 9/2010 | Ramli et al. | 428/216 |
| 2010/0256309 A1* | 10/2010 | Endo | B29C 55/14 |
| | | | 525/384 |
| 2011/0039151 A1 | 2/2011 | Mitchell | |
| 2011/0143123 A1* | 6/2011 | Ito | B32B 27/36 |
| | | | 428/323 |
| 2011/0154699 A1* | 6/2011 | Walsh et al. | 40/306 |
| 2011/0268979 A1* | 11/2011 | Ambroise | C08L 23/04 |
| | | | 428/516 |
| 2013/0011631 A1* | 1/2013 | Sakellarides | B32B 27/06 |
| | | | 428/195.1 |
| 2013/0177802 A1* | 7/2013 | Zaikov | 429/176 |
| 2013/0224412 A1 | 8/2013 | Muta et al. | |
| 2014/0299254 A1* | 10/2014 | Rackovan et al. | 156/85 |
| 2015/0111092 A1* | 4/2015 | Janousek | B32B 27/08 |
| | | | 429/163 |

FOREIGN PATENT DOCUMENTS

| | | | |
|---|---|---|---|
| CN | 101362539 A * | 2/2009 | |
| CN | 101531079 * | 9/2009 | |
| CN | 101531079 A * | 9/2009 | |
| DE | 10 2007 018 182 | 3/2013 | |
| EP | 1 862 517 A * | 12/2007 | |
| EP | 1951524 | 8/2010 | |
| EP | 1876019 | 1/2013 | |
| JP | 63-139725 | 6/1988 | |
| JP | 3-045631 | 2/1991 | |
| JP | 1994-500963 | 1/1994 | |
| JP | 1994-270248 | 9/1994 | |
| JP | 7-053737 | 2/1995 | |
| JP | 7-216107 | 8/1995 | |
| JP | 7-216109 | 8/1995 | |
| JP | 9-254257 | 9/1997 | |
| JP | 2001-071442 | 3/2001 | |
| JP | 2001-196033 A * | 7/2001 | |
| JP | 2002-052672 | 2/2002 | |
| JP | 2002-052672 A * | 2/2002 | |
| JP | 2004-122385 | 4/2004 | |
| JP | 2005-506218 | 3/2005 | |
| JP | 2006-027207 | 2/2006 | |
| JP | 2007-268841 A * | 10/2007 | |
| JP | 2008-062640 | 3/2008 | |
| JP | 2008-525235 | 7/2008 | |
| JP | 2008-207487 | 9/2008 | |
| JP | 2008-285621 A * | 11/2008 | |
| WO | 00/27631 | 5/2000 | |
| WO | 01/12697 | 2/2001 | |
| WO | 03/037967 | 5/2003 | |
| WO | 2006/071826 | 7/2006 | |
| WO | 2009/013284 | 1/2009 | |
| WO | 2009/111058 | 9/2009 | |
| WO | 2009/142805 | 11/2009 | |
| WO | WO 2010/016563 A * | 2/2010 | |
| WO | 2010/047906 | 4/2010 | |

OTHER PUBLICATIONS

"Free Dictionary—Material" (https://www.the freedictionary.com/material) (webpage retrieved May 10, 2018). (Year: 2018).*

International Search Report and Written Opinion issued in corresponding IA No. PCT/US2012/059896 dated Dec. 7, 2012.

International Preliminary Report on Patentability issued in corresponding IA No. PCT/US2012/059896 dated Apr. 15, 2014.

Written Opinion of the International Searching Authority issued in corresponding IA No. PCT/US2012/059901 dated Jan. 15, 2013.

International Search Report issued in corresponding IA No. PCT/US2012/059901 dated Jan. 15, 2013.

International Preliminary Report on Patentability issued in corresponding IA No. PCT/US2012/059901 dated Jul. 15, 2014.

"Resin Acids," Rompp's Chemistry Lexicon, edited by Jurgen Falbe and Mafred Regitz, vol. 3 H-L, p. 1737, 1990.

Nentwig, "Additives, Colorants and Fillers," Plastic Films, Manufacture, Properties, Application, 3rd edition, pp. 179-181, 2006.

Product Sheet, FerroLube PET-110, Feb. 2007, 1 page.

"Antiblock and Slip Agents," Modern Plastics Handbook, edited by Modern Plastics and Charles A. Harper, Chapter 4.3, 1999.

Kromminga, et al., "Anti-blocking Additives," Plastics Additives Handbook, 5th ed., edited by Dr. Hans Zweifel, Chapter 7, pp. 585-600, 2000.

"Handbook on Pet Film and Sheets, Urethane Foams, Flexible Foams, Rigid Foams, Specialty Plastics, Stretch Blow Moulding, Injection Blow Moulding, Injection and Co-Injection Preform Technologies," by NIR Board of Consultants and Engineers, Chapter 9, pp. 505-525, 2005.

Wikimedia Foundation, "Polyethylene glycol," https://en.wikipedia.org/wiki/polyethylene_glycol, 8 pages.

Hovenkamp et al., "Formation of Diethylene Glycol as a Side Reaction during Production of Polyethylene Terephthalate," Journal of Polymer Science, Part A-1, vol. 8, 679-682, 1970.

Kim et al., "Identification of Kinetics of Direct Esterfication Reactions for PET Synthesis Based on a Genetic Algorithm," Korean J. Chem, Eng, 18(4), 432-441, 2001.

"Cast, Polypropylene," The Wiley Encyclopedia of Packaging Technology, 3rd edition, edited by Kit L. Yam, pp. 248-250, 2009.

* cited by examiner

SHRINK FILM FOR LABEL

RELATED APPLICATIONS

The present application claims the benefit of U.S. Provisional Application 61/547,464 filed on Oct. 14, 2011 and titled "Shrink Film For Label," the entire disclosure of which is incorporated herein by reference.

TECHNICAL FIELD OF THE INVENTION

The present invention relates to shrink films and provides shrink films comprising a modified polyester (e.g., a glycol-modified polyethylene terephthalate) material. The shrink films may be useful in encapsulating cylindrical articles including bottles, batteries, etc.

BACKGROUND OF THE INVENTION

Shrink film has been used for years to encapsulate articles. The shrink film must be able to shrink sufficiently to provide a smooth consistent coating. Previously, shrink films have been made from polyolefins and polyolefin blends and used extensively in the food and packaging business to protect and preserve articles such as food. One problem with polyolefin and polyolefin film blends is the difficulty of printing on the film. For printing to be successful, the films must provide a surface which will accept printing. Additionally the films must have sufficient tensile modulus to withstand the rigors of the printing process. Some polyolefin films do not have the tensile strength to withstand gravure printing. Some polyolefin shrink films may be able to withstand gravure printing but may still exhibit poor performance when placed on the article to be encapsulated, e.g., a battery.

Polyvinyl chloride (PVC) films provide acceptable shrinkages of about 40% to 45%. However, PVC shrink films have a problem with heat stability. Often, after the shrink film has been formed, the film may be exposed to elevated temperatures, such as in transport, which may cause the film to shrink prematurely. Another problem with PVC shrink films is concern over the environmental impact of PVC film, which forms harmful dioxins when incinerated. Concern regarding potentially adverse effect of halogens on the ozone layer has lead to efforts to provide halogen free shrink films.

Batteries are typically encapsulated by shrink films. The film must shrink sufficiently to encase the battery. A problem with encapsulating batteries and other cylindrical article is end puckering, which occurs when the shrink film does not shrink sufficiently to provide a smooth encapsulating film at the ends of the battery. The film folds over itself and forms a "pucker." This puckering is unacceptable to consumers and, therefore, also to the manufacturer.

Battery encapsulating is done at very high speeds. The speed of the labeling is often more that 700 labels applied per minute. It is difficult for typical shrink film labels to work under such high speed conditions.

SUMMARY OF THE INVENTION

The present invention provides, in one aspect, a halogen-free, multilayered heat shrink film comprising a core layer having an upper and lower surface comprising a modified polyester, a first skin layer on the upper surface of the core layer, the skin layer comprising a resin material and an antiblock material, and a second skin layer on the lower surface of the core layer, the second skin layer comprising a resin material and an antiblock material.

The present films overcome problems associated with films that comprise standard polyesters. Polyesters, even modified polyesters, exhibit high coefficients of friction, which presents problems during processing and converting in that the films may not wind. The present configurations with the modified polyester core and the skin layers comprising the antiblock agent provide films that exhibit excellent shrink properties and heat stability as well as properties for processing the labels including during converting processes.

In one aspect, the present invention provides a multilayered shrink film comprising a core layer comprising a glycol modified polyester, the core having an upper and lower surface; an upper skin layer disposed on the upper surface of the core layer and a lower skin layer disposed on the lower surface of the core layer, the skin layers each individually comprising (a) a resin material; and (b) an antiblocking agent.

According to one embodiment, the core layer comprises about 60 to 100% by weight of the glycol modified polyester.

According to one embodiment, the core layer comprises about 100% by weight of glycol modified polyester.

According to one embodiment, the modified polyester is derived from a dicarboxylic acid and a difunctional alcohol other than ethylene glycol.

According to one embodiment, the glycol modified polyester comprises a polymer derived from a carboxylic difunctional acid and at least two difunctional alcohols, one of which may be ethylene glycol.

According to one embodiment, the difunctional carboxylic acid is chosen from terephthalic acid, isophthalic acid, phthalic acid, 2,5-dimethylterephthalic acid, 5-t-butyl-isophthalic acid, 4,4'-biphenyldicarboxylic acid, trans-3,3'-stilbenedicarboxylic acid, trans-4,4'-stilbenedicarboxylic acid, 4,4'-dibenzyldicarboxylic acid, 1,4-naphthalenedicarboxylic acid, 1,5-naphthalenedicarboxylic acid, 2,3-naphthalenedicarboxylic acid, 2,6-naphthalenedicarboxylic acid, 2,7-naphthalenedicarboxylic acid, 2,2,6,6-tetramethylbiphenyl-4,4'-dicarboxylic acid, 1,1,3-trimethyl-3-phenylindene-4,5-dicarboxylic acid, 1,2-diphenoxyethane-4,4'-dicarboxylic acid, diphenyl ether dicarboxylic acid, 2,5-anthracenedicarboxylic acid, 2,5-pyridinedicarboxylic acid, or a combination of two or more thereof.

According to one embodiment, the difunctional alcohol may be chosen from aliphatic diols, alicyclic diols, aromatic diols, or combinations of two or more thereof.

According to one embodiment, the difunctional alcohol is chosen from ethylene glycol, diethylene glycol, 1,2-propanediol, 1,3-propanediol, 1,3-butanediol, 1,4-butanediol, 1,5-pentanediol, 2,2-dimethyl-1,3-propanediol (neopentyl glycol), 1,6-hexanediol, 2-ethyl-2-methyl-1,3-propanediol, 2,2-diethyl-1,3-propanediol, 1,8-octanediol, 2-ethyl-2-butyl-1,3-propanediol, 2-ethyl-2,4-dimethyl-1,3-hexanediol, 1,10-decanediol, polyethylene glycol, polypropylene glycol, 1,2-cyclohexanedimethanol, 1,3-cyclohexanedimethanol, 1,4-cyclohexanedimethanol, 2,2,4,4-tetramethyl-1,3-cyclobutanediol, 2,2-bis(4'-β-hydroxyethoxydiphenyl)propane bis(4'-β-hydroxyethoxyphenyl)sulfone, xylylene glycol, and combinations of two or more thereof.

According to one embodiment, the glycol modified polyester is a glycol modified polyethylene terephthalate.

According to one embodiment, the glycol modified polyester comprises an alkylene glycol chosen from ethylene glycol, propylene glycol, butylene glycol, pentylene glycol, 1,6-hexanediol, 2,2-dimethyl-1,3-propanediol, or a combination of two or more thereof.

According to one embodiment, the core layer comprises a blend of two or more modified polyesters.

According to one embodiment, the antiblocking agent is chosen from diatomaceous earth, aluminum silicates, silicon dioxide, quarts, glass, silica sand, kaolin, talc, feldspar, calcium carbonate, gel-type synthetic silica, precipitated-type synthetic silica, sodium calcium aluminosilicate, calcium silicate, metal oxides of Group 2, 3, 4, 5, 13, or 14 metals, or combinations of two or more thereof.

According to one embodiment, the upper and lower skin layers individually comprise about 90 to about 99.99% by weight of the resin and about 0.01 to about 10% by weight of the antiblocking agent.

According to one embodiment, the upper and lower skin layers individually comprise about 92.5 to about 99.5% by weight of the resin and about 0.5 to about 7.5% by weight of the antiblocking agent.

According to one embodiment, the upper and lower skin layers individually comprise about 95 to about 99% by weight of the resin and about 1 to about 5% by weight of the antiblocking agent.

According to one embodiment, the upper and lower skin layers individually comprise about 97.5 to about 99% by weight of the resin and about 1 to about 2.5% by weight of the antiblocking agent.

According to one embodiment, the resin material in the upper and lower skin layers is individually chosen from a polyester material, a modified polyester, a polyolefin, or a combination of two or more thereof.

According to one embodiment, the skin layers individually comprise polylactic acid or a glycol modified polyethylene terephthalate material.

According to one embodiment, the thickness ratio of the core layer to the skin layers is about 90:10. According to one embodiment, the thickness ratio of the core layer to the skin layers is about 80:20. In another embodiment, the thickness ratio of the core layer to the skin layers is about 70:30.

According to one embodiment, the upper skin:core:lower skin thickness ratio is about 2.5-20:95-60:20-2.5.

According to one embodiment, the upper skin:core:lower skin thickness ratio is about 5:90:5.

According to one embodiment, at least one of the upper skin layer and the lower skin layer comprises print indicia thereon.

According to one embodiment, at least one of the upper skin layer and the lower skin layer comprises an adhesive layer thereon.

According to one embodiment, the shrink film is oriented in the machine direction, the cross direction, or both. In one embodiment, the orientation ratio is from about 1.1:1 to about 4:1. In another embodiment, the orientation is about 2:1 to about 3:1. In one embodiment, for use in encapsulating a battery, the shrink film is oriented in only the machine direction.

According to one embodiment, the shrink film has a shrink initiation temperature of about 45 to about 65° C. In another embodiment, the film has a shrink initiation temperature of about 55 to about 65° C.

In another aspect, the present invention provides an article encapsulated with a shrink film a core layer comprising a glycol modified polyester, the core having an upper and lower surface; an upper skin layer disposed on the upper surface of the core layer and a lower skin layer disposed on the lower surface of the core layer, the skin layers each individually comprising (a) a resin material; and (b) an antiblocking agent. In one embodiment, the article is a battery.

The films have good shrinkage and avoid end puckering. Additionally, the films are printable, using a variety of printing techniques including with gravure printing. The films and labels produced therefrom may be applied at high speeds and have good heat stability, e.g., they do not prematurely shrink, even at temperatures approaching 65° C. (149° F.).

BRIEF DESCRIPTION OF THE DRAWINGS

Embodiments of the present disclosure are described herein with reference to the drawing wherein.

DETAILED DESCRIPTION OF THE INVENTION

A shrink film suitable for use as a shrink label to cover and encapsulate a variety of articles comprises a core and outer layers disposed about the core. The shrink films are useful in a variety of applications including, but not limited to, encapsulating cylindrical articles.

Figure 1:
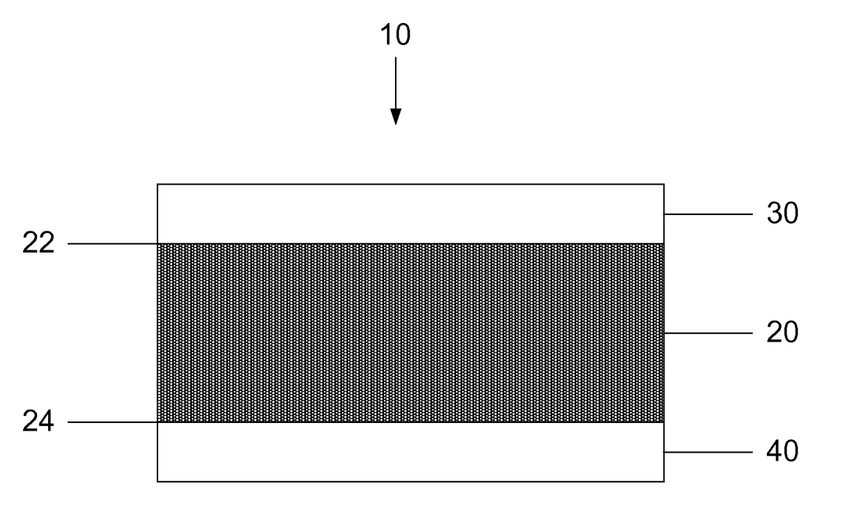
FIG. 1 illustrates a side view of a shrink film in accordance with an embodiment of the present invention.

Referring to FIG. 1, a shrink film 10 comprises a core layer 20 and outer layers 30, 40 disposed on opposite surfaces of the core layer 10. The outer layers may also be referred to as skin layers or skins, and FIG. 1 shows the core layer 20 between an upper (or first) skin layer 30 and a lower (or second) skin layer 40. As shown in FIG. 1, the shrink film 10 is a three layer film comprising a first skin layer 30 disposed on a first (upper) surface 22 of the core layer 20, and a second skin layer 40 disposed on a second (lower) surface 24 of the core layer 20.

The core layer comprises a glycol modified polyester material. A glycol modified polyester material comprises a polymer made by polymerization of a dicarboxylic acid with (1) a difunctional alcohol monomer other than ethylene glycol, or (2) two or more difunctional alcohol monomers, one of which may be ethylene glycol. In one embodiment, a glycol modified polyester may comprise a polymer made by polymerization of a dicarboxylic acid with a two or more difunctional alcohols, at least one of which is ethylene glycol.

The difunctional carboxylic acid may be an aromatic dicarboxylic acid. Examples of aromatic dicarboxylic acids suitable for use in the modified polyester resin include, but are not limited to, terephthalic acid, isophthalic acid, phthalic acid, 2,5-dimethylterephthalic acid, 5-t-butyl-isophthalic acid, 4,4'-biphenyldicarboxylic acid, trans-3,3'-stilbenedicarboxylic acid, trans-4,4'-stilbenedicarboxylic acid, 4,4'-dibenzyldicarboxylic acid, 1,4-naphthalenedicarboxylic acid, 1,5-naphthalenedicarboxylic acid, 2,3-naphthalenedicarboxylic acid, 2,6-naphthalenedicarboxylic acid, 2,7-naphthalenedicarboxylic acid, 2,2,6,6-tetramethylbiphenyl-4,4'-dicarboxylic acid, 1,1,3-trimethyl-3-phenylindene-4,5-dicarboxylic acid, 1,2-diphenoxyethane-4,4'-dicarboxylic acid, diphenyl ether dicarboxylic acid, 2,5-anthracenedicarboxylic acid, 2,5-pyridinedicarboxylic acid, derivatives thereof, or a combination of two or more thereof. In one embodiment, the aromatic dicarboxylic acid component is terephthalic acid.

The glycol modified polyester resin for use herein may also contain one or more aliphatic or alicyclic difunctional dicarboxylic acids as copolymerization components. Non-limiting examples of suitable aliphatic dicarboxylic acid components include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, heptadecanedioic acid, octadecanedioic acid, nonadecanedioic acid, icosanedioic acid, docosanedioic acid, 1,12-dodecanedionoic acid, and derivatives of thereof. Non-limiting examples of suitable alicyclic dicarboxylic acid components include 1,3-cyclopentanedicarboxylic acid, 1,2-cyclohexanedicarboxylic acid, 1,3-cyclohexanedicarboxylic acid, 1,4-cyclohexanedicarboxylic acid, 1,4-decahydronaphthalenedicarboxylic acid, 1,5-decahydronaphthalenedicarboxylic acid, 2,6-decahydronaphthalenedicarboxylic acid, and substitution derivatives of them. It will be appreciated that the copolymerization components can be used alone or in combination.

As previously described, a glycol modified polyester comprises a component derived from a difunctional alcohol. In one embodiment, a glycol modified polyester comprises a component derived from a single type of difunctional alcohol other than ethylene glycol. In another embodiment, a glycol modified polyester comprises components derived from two or more difunctional alcohols where one of the two or more monomers may be ethylene glycol.

The difunctional alcohols used to form the glycol modified polyester may include, for example, aliphatic diols, alicyclic diols, aromatic diols, or combinations of two or more thereof. Non-limiting examples of suitable aliphatic diols include ethylene glycol (when used in conjunction with at least one of the difunctional alcohol), diethylene glycol, 1,2-propanediol, 1,3-propanediol, 1,3-butanediol, 1,4-butanediol, 1,5-pentanediol, 2,2-dimethyl-1,3-propanediol (neopentyl glycol), 1,6-hexanediol, 2-ethyl-2-methyl-1,3-propanediol, 2,2-diethyl-1,3-propanediol, 1,8-octanediol, 2-ethyl-2-butyl-1,3-propanediol, 2-ethyl-2,4-dimethyl-1,3-hexanediol, 1,10-decanediol, polyethylene glycol, and polypropylene glycol. Non-limiting examples of suitable alicyclic diols include 1,2-cyclohexanedimethanol, 1,3-cyclohexanedimethanol, 1,4-cyclohexanedimethanol, and 2,2,4,4-tetramethyl-1,3-cyclobutanediol. Non-limiting examples of suitable aromatic diols include ethylene oxide adducts of bisphenol compounds such as 2,2-bis(4'-β-hydroxyethoxydiphenyl)propane and bis(4'-β-hydroxyethoxyphenyl)sulfone, and xylylene glycol.

In one embodiment, the modified polyester comprises 50 mole % of the difunctional alcohol and 50 mole % of the dicarboxylic acid, i.e., a 1:1 mole ratio of difunctional alcohol to dicarboxylic acid. In embodiments, where the glycol modified polyester is derived from more then one difunctional alcohol, the total mole percent of difunctional alcohol is 50%, and the percent of each difunctional alcohol may be selected as desired for a particular purpose or intended use including to adjust the properties of the glycol modified polyester. In one embodiment, the glycol modified polyester is derived from a first difunctional alcohol in an amount of 0.1 to 49.9 mole % and a second difunctional alcohol in an amount of 49.9 to 0.1 mole %. In one embodiment, the glycol modified polyester is derived from a first difunctional alcohol in an amount of 1 to 49 mole % and a second difunctional alcohol in an amount of 49 to 1 mole %. In one embodiment, the glycol modified polyester is derived from a first difunctional alcohol in an amount of 5 to 45 mole % and a second difunctional alcohol in an amount of 45 to 5 mole %. In one embodiment, the glycol modified polyester is derived from a first difunctional alcohol in an amount of 10 to 40 mole % and a second difunctional alcohol in an amount of 40 to 10 mole %. In one embodiment, the glycol modified polyester is derived from a first difunctional alcohol in an amount of 25 mole % and a second difunctional alcohol in an amount of 25 mole %. It will be appreciated that a glycol modified polyester is not limited to such embodiments and may comprise more than two difunctional alcohol components to provide a total difunctional alcohol content of 50 mole %. Here as elsewhere in the specification and claims, numerical values may be combined to create new or non-disclosed ranges.

In one embodiment, the modified polyester is a glycol modified polyethylene terephthalate (PETG). A glycol modified polyethylene terephthalate may be made by condensing terephthalic acid with a difunctional alcohol other than ethylene glycol, or two or more types of difunctional alcohols (where one of the two or more difunctional alcohols may be ethylene glycol). In one embodiment, a PETG is made by condensing terephthalic acid with ethylene glycol and cyclohexane dimethenol. In another embodiment, the glycol modified polyester employs a dimethyl ester of terephthalic acid.

Examples of suitable materials for the modified PETG include, but are not limited to, modified PETG resins available from Eastman including those sold under the trade names EASTAR, Eastman STECTAR, Eastman EMBRACE, The modified polyester may be thermoplastic. The modified polyester may be substantially amorphous, or may be partially crystalline (semi-crystalline). The modified polyester may have a crystallinity of at least about, and/or at most about, any of the following weight percentages: from about 5 to about 50%, from about 10 to about 40%, from about 15 to about 35%, even from about 20 to about 30%. In one embodiment, the modified polyester has a crystallinity of about 25%. Here as elsewhere in the specification and claims, individual ranges can be combined or modified to form additional or non-disclosed ranges. The crystallinity may be determined indirectly by the thermal analysis method, which uses heat-of-fusion measurements made by differential scanning calorimetry ("DSC"). All references to crystallinity percentages of a polymer, a polymer mixture, a resin, a film, or a layer in this application are by the DSC thermal analysis method, unless otherwise noted. The DSC thermal analysis method is believed to be the most widely used method for estimating polymer crystallinity, and thus appropriate procedures are known to those of skill in the art. See, for example, "Crystallinity Determination," Encyclopedia of Polymer Science and Engineering, Volume 4, pages 482-520 (John Wiley & Sons, 1986), of which pages 482-520 are incorporated herein by reference. Under the DSC thermal analysis method, the weight fraction degree of crystallinity (i.e., the "crystallinity" or "Wc") is defined as $\Delta Hf/\Delta Hf,c$ where "$\Delta Hf$" is the measured heat of fusion for the sample (i.e., the area under the heat-flow versus temperature curve for the sample) and "$\Delta Hf,c$" is the theoretical heat of fusion of a 100% crystalline sample. The $\Delta Hf,c$ values for numerous polymers have been obtained by extrapolation methods; see for example, Table 1, page 487 of the "Crystallinity Determination" reference cited above. The $\Delta Hf,c$ for polymers are known to, or obtainable by, those of skill in the art. The $\Delta Hf,c$ for a sample polymer material may be based on a known $\Delta Hf,c$ for the same or similar class of polymer material, as is known to those of skill in the art. For example, the $\Delta Hf,c$ for polyethylene may be used in calculating the crystallinity of an EVA material, since it is believed that it is the polyethylene backbone of EVA rather than the vinyl acetate pendant portions of EVA that forms crystals. Also by way of example, for a sample containing a blend of polymer materials, the ΔHf,c for the blend may be estimated using a weighted average of the appropriate ΔHf,c for each of the polymer materials of separate classes in the blend. The DSC measurements may be made using a thermal gradient for the DSC of 10° C./minute. The sample size for the DSC may be from 5 to 20 mg.

The core layer may comprise one or more modified polyesters. In one embodiment, the core layer comprises a blend of at least two different modified polyesters. Modified polyesters may be different from one another in terms of the respective components that form the polyester or, if comprising the same components, in terms of the percentage of each component in the respective modified polyesters. In one embodiment, the core layer comprises at least one PETG material. In another embodiment the core layer comprises a blend of at least two PETG materials.

The modified polyester resin may have a glass transition temperature (Tg) of from about 50° C. to about 100° C. In one embodiment, the modified polyester resin has a glass transition temperature of from about 60° C. to about 90° C. In still another embodiment, the modified polyester resin has a glass transition temperature of from about 70° C. to about 80° C. It will be appreciated that a blend of two or more modified polyesters will also exhibit a glass transition temperature that may be the same or different than the glass transition temperatures of the individual modified polyesters used to form the blend. Here as elsewhere in the specification and claims, numerical values may be combined to create new or non-disclosed ranges.

The shrink initiation temperature of the film may be adjusted or controlled based on the modified polyesters used in the core. Without being bound to any particular theory, the glass transition temperature may affect the shrink initiation temperature of the film. Further, the shrink initiation temperature may be adjusted by employing a blend of two different modified polyesters resins in the core. In one embodiment, the core comprises a PETG, and the shrink initiation temperature of the film may be adjusted based on the difunctional alcohols chosen to form the modified polyester. In one embodiment, the PETG materials selected for any of the core and skin layers are chosen to provide the film with a desired shrink initiation temperature range. In one embodiment, the film has a shrink initiation temperature of about 45 to about 65° C. In another embodiment, the film has a shrink initiation temperature of about 50 to about 60° C. In still another embodiment, the film has a shrink initiation temperature of about 55 to about 65° C. Here as elsewhere in the specification and claims numerical volumes can be combined to form new or non-disclosed ranges.

The core layer may comprise from about 60 wt. % to about 100 wt. % of a modified polyester resin based on the total weight of the core layer. In one embodiment, the core layer comprises from about 90 wt. % to about 100 wt. % of a modified polyester resin based on the total weight of the core layer. In another embodiment, the core layer comprises 100 wt. % of a modified polyester resin. In embodiments comprising less than 100 wt. % of PETG, the balance of the composition may be an additive or suitable filler material to impart desired properties to the film. The core layer may, in one embodiment, consist essentially of a modified polyester resin or a blend of two or more modified polyester resins. The core layer, in another embodiment, may consist of a modified polyester resin or a blend of modified polyester resins. In one embodiment, the core layer comprises a PETG in an amount of about 100 wt. %. In another embodiment, the core layer comprises a blend of two or more PETGs in an amount of about 100 wt. %.

The polymeric film material for forming the core layer may be free of inorganic fillers and/or pigments for clear films and clear labels, or the polymeric film material may be cavitated and/or contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include, but are not limited to, calcium carbonate, titanium dioxide, metal particles, fibers, flame retardants, antioxidant compounds, heat stabilizers, light stabilizers, ultraviolet light stabilizers, antiblocking agents, processing aids, acid acceptors, etc.

The skin layers (e.g., skins 30, 40) comprise a resin material and an antiblock agent. In one embodiment, the resin material is chosen from, a modified polyester, a polyolefin, or a combination of two or more thereof. In one embodiment, the skin layers comprise a modified polyester or a mixture of two or more modified polyesters. The modified polyesters may be chosen from any modified polyester resin that is also suitable for use in the core layer. The modified polyester(s) in the skin layers may be the same or different than the modified polyester employed in the core. Further, the skin layers may have the same composition as each other or may have a different composition in terms of the modified polyester, the antiblock, the percentage of the modified polyester, the percentage of antiblocking agent used in the layers, or two or more of these parameters. In one embodiment, the skin layers comprise a glycol modified PET.

In one embodiment, the skin layer may further comprise a polyester resin blended with the modified polyester material or a polyolefin material. Polyesters may include polymers formed by the condensation of a difunctional carboxylic acid and a difunctional alcohol, the polycondensation of hydrocarboxylic acid, and the polymerization of cyclic esters. Non-limiting examples of suitable polyesters include PET, polylactic acid (PLA), etc.

In one embodiment, the skin layers comprise a polyolefin. The polyolefin may be a homopolymer or copolymer of an olefin such as ethylene, propylene, butylene, pentene, hexene, heptene, octene, nonene, decene, etc., alpha-olefins having 3 to 12 carbons, or combinations of two or more thereof.

Suitable antiblocking agents include mineral-based and/or synthetic inorganic materials. Mineral-based antiblocking agents include both those that are silica-based (e.g., diatomaceous earth, aluminum silicates, silicon dioxide, quarts, glass, and silica sand), as well as others such as kaolin, talc, feldspar, and calcium carbonate. Synthetic antiblocking agents include gel-type and precipitated-type synthetic silicas. Non-limiting examples of suitable inorganic antiblocking agents include aluminum silicate (i.e. clay), silica, sodium calcium aluminosilicate, magnesium silicate (talc), and calcium silicate, particularly aluminum silicate, silica, sodium calcium aluminosilicate, and magnesium silicate. Examples of suitable porous inorganic oxide antiblocking agents include, but are not limited to, metal oxides of element from Group 2, 3, 4, 5, 13, or 14 of the Periodic Table of Elements. Suitable metal oxides include, but are not limited to, metal oxides containing elements from Groups 4, 13, and 14. Non-limiting examples of suitable anti-block agents include silica, alumina, silica-alumina, and mixtures thereof. Other inorganic oxides that may be employed either alone or in combination with the silica, alumina, or silica-alumina include magnesia, titania, zirconia, and the like. One non-limiting example of a commercially available suitable ant-block agent is Sibelite™ M4000 (Sibelco), a high purity silica.

Other suitable antiblocking agents useful in the skin layers include cross linked or uncross linked organic materials. Examples include EVOH, polyamide 6, polyamide 66, syndiotactic polystyrene, poly(methyl methacrylate), engineering resins, liquid crystalline polymers, and aramids.

In one embodiment, at least one of the skin layers comprises about 90 to about 99.99 wt. % of the resin material and about 0.01 to about 10 wt. % anti-blocking agent. In another embodiment, at least one of the skin layers comprises about 92.5 to about 99.5 wt. % of resin material and about 0.5 to about 7.5 wt. % anti-blocking agent. In another embodiment, at least one of the skin layers comprises about 95 to about 99 wt. % of the resin material and 1 to about 5 wt. % anti-blocking agent. In another embodiment, at least one of the skin layers comprises 97.5 to about 99 wt. % of the resin material and 1 to about 2.5 wt. % anti-blocking agent.

In one embodiment at least one of the skin layers comprises a PETG and an antiblocking agent. In one embodiment, at least one of the skin layers comprises 90 to about 99.99 wt. % of a PETG and about 0.01 to about 10 wt. % anti-blocking agent. In another embodiment, at least one of the skin layers comprises about 92.5 to about 99.5 wt. % of a PETG and about 0.5 to about 7.5 wt. % anti-blocking agent. In another embodiment, at least one of the skin layers comprises about 95 to about 99 wt. % of a PETG and about 1 to about 5 wt. % anti-blocking agent. In another embodiment, at least one of the skin layers comprises about 97.5 to about 99 wt. % PETG and about 1 to about 2.5 wt. % anti-blocking agent.

In another embodiment at least one of the skin layers comprises polylactic acid (PLA) and an antiblocking agent. In one embodiment, at least one of the skin layers comprises about 90 to about 99.99 wt. % PLA and about 0.01 to about 10 wt. % anti-blocking agent. In another embodiment, at least one of the skin layers comprises about 92.5 to about 99.5 wt. % PLA and about 0.5 to about 7.5 wt. % anti-blocking agent. In another embodiment, at least one of the skin layers comprises about 95 to about 99 wt. % PLA and about 1 to about 5 wt. % anti-blocking agent. In another embodiment, at least one of the skin layers comprises about 97.5 to about 99 wt. % PLA and about 1 to about 2.5 wt. % anti-blocking agent.

In an embodiment where the skin layers are of a different class of material from the core layer (e.g., a non-PETG material), a tie layer may need to be employed between the skin layer and the core layer. The tie layers may comprise any polymer that improves adhesion of a core layer and a skin layer. Examples of suitable tie layers include, but are not limited to, polyethylene copolymers including, for example, ethylene-alpha-olefin copolymers having a high alpha-olefin comonomer content; alkene-unsaturated carboxylic acid or carboxylic acid derivative copolymers such as, for example, ethylene-methacrylic acid copolymers and ethylene-vinyl acetate copolymers and ionomers such as zinc salts of ethylene-methacrylic acid copolymers, unsaturated dicarboxylic acid anhydride grafted polymers and copolymers such as maleic anhydride grafted ethylene-vinyl acetate copolymers and maleic anhydride grafted polyethylenes, styrene-butadiene copolymers, $C_3$ or higher alpha-olefin copolymers having a high alpha-olefin comonomer content such as, for example, a propylene-1-butene copolymer having a 1-butene content up to 14% by weight. Examples of suitable tie layers include Platamid, available from Elf Atochem, and CXA, Bynel, or Plexar series of tie layers available from DuPont Chemical.

The tie layers may be comprised of one or more adhesive materials optionally in combination with one or more additional film forming thermoplastic polymeric materials. Suitable adhesive materials include, but are not limited to, ethylene vinyl acetate copolymers, ethylene methyl acrylate copolymers and ethylene butyl acrylate copolymers. An example of a commercially available material that can be used is the ethylene methyl acrylate copolymer available from ExxonMobil under the trade designation Optema TC 120. This material is identified as having a methyl acrylate content of 21.5% by weight, a density of 0.942 g/cc, and a melt index of 6.0 g/10 min. Another example is AT Plastics EVA 1821. Other suitable film forming thermoplastic polymeric materials that can be used include, but are not limited to, polypropylene, copolymers of ethylene and propylene, medium density polyethylene (density of about 0.924 to about 0.939 g/cc), terpolymers of ethylene, vinyl acetate and malic anhydride, and terpolymers of ethylene, vinyl acetate and acrylic acid. An example of a commercial thermoplastic polymeric material that may be used is Union Carbide-Dow 5A97. The weight ratio of adhesive material to additional film forming thermoplastic polymeric material may range from about 10:90 to about 100:0, and in one embodiment about 40:60 to about 70:30, and in one embodiment about 50:50.

The melt index of the skin layers, when tested at 230° C. using a 2.16 kg weight, may be in the range of 4 to 12 g/10 min, about 5 to about 10 g/10 min, or about 6 to about 8 g/10 min. Here as elsewhere in the specification and claims, numerical values may be combined to form new or non-disclosed ranges.

The thickness of the film and the respective core and skin layers may be chosen as desired for a particular purpose or intended use. The film may have a thickness in one embodiment, from about 0.5 to about 12 mils. In another embodiment, the film may have a thickness of from about 1.5 to about 10 mils. In another embodiment, the film may have a thickness of from about 3 to about 7 mils. In one embodiment, the shrink film has a thickness of about 1.5 mils. In another embodiment, the shrink film has a thickness of about 2.0 mils. Here and else where in the specification, individual numerical values can be combined to form additional and/or non-disclosed ranges.

The core layer may have a thickness as desired for a particular purpose or intended use. In one embodiment, the core layer may have a thickness of from about 0.25 to 11.5 mils, from about 0.5 to about 10 mils, from about 1 to about 8 mils, from about 2.5 to about 5 mils, etc. Here as elsewhere in the specification and claims, individual ranges may be combined or modified to form additional and/or non-disclosed ranges. In embodiments, the core may be relatively thick compared to the outer skin layers. In one embodiment, the core layer may be about 2 to 20 times as thick as each of the skin layers.

In embodiments, the thickness ratio of the core to the outer layers combined is 95:5, 90:10, 80:20, 70:30, etc. In one embodiment, the thickness ratio upper skin layer:core: lower skin layer is 2.5-20:95-60:20-2.5, or in another embodiment, 5-15:70-90:15-5. in embodiments, the thickness ratio for the shrink films include 2.5:95:2.5, 5:90:5, 10:80:10, 15:70:15, 20:60:20, etc. The two skin layers do not have to be of equal thickness. Other embodiments of thickness ratios for the shrink films include 2.5:92.5:5, 5:92.5:2.5, 15:75:10, 10:75:15, 5:85:10, 10:85:5. Here as elsewhere in the specification and claims, individual numerical values can be combined to form additional and/or non-disclosed ranges.

As described above, the shrink films are useful in many shrink film applications. The films may be converted to a label by adding a pressure sensitive adhesive to one side of the film. Print indicia may be placed onto either side of the film prior to adding a pressure sensitive adhesive or back-printed prior to applying the adhesive.

The adhesive may be any of those known to those skilled in the art. The pressure sensitive adhesive may be any solvent or emulsion based pressure sensitive adhesive such as acrylic or rubber based pressure sensitive adhesives. Typically, the adhesive is placed onto the film at a coat weight of about 10 to about 40, or from about 20 to about 25 grams/m$^2$. An example of a particularly useful adhesive is S2001 available from Avery Chemicals.

The film may be manufactured by film-forming processes known in the art. The film may be prepared by extrusion or co-extrusion utilizing, for example, a tubular trapped bubble film process, a flat cast film process, a slit die flat cast film process, or any other suitable method for forming a film. The film may also be prepared by applying one or more layers by extrusion coating, adhesive lamination, extrusion lamination, solvent-borne coating, or by latex coating (e.g., spread out and dried on a substrate). These processes are known to those of skill in the art.

It will be appreciated that the shrink films are oriented in a at least one direction. The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) and for example at a temperature below the film's melting point. The film may then be quickly cooled to retain the physical properties generated during orientation and to provide a heat-shrink characteristic to the film. The film may be oriented using, for example, a tenter-frame process or a bubble process. The orientation may occur in any of one direction (i.e., the machine or transverse direction) and/or two directions (e.g., the machine and transverse directions) by a ratio of about 1.1:1 to about 4:1, about 1.2:1 to about 3.8:1, about 1.5:1 to about 3.5:1, about 1.8:1 to about 3.2:1, even about 2:1 to about 3:1. The film may be stretched by any of these amounts in one direction and another of any of these amounts in another direction. In one embodiment, for use as a shrink film to encapsulate a battery, the film is oriented in only the machine direction.

The film may have a free shrink at 100° C. in one direction (e.g., the machine direction or the transverse direction) and/or in both the machine and transverse directions of about, 5% to about 80%, about 7% to about 75%, about 9% to about 70%, about 10% to about 60%, about 12% to about 55%, about 15 to about 50%, about 25% to about 45%, even about 30% to about 40%. In one embodiment, the film has a free shrink of at least about 40% in at least one direction. In another embodiment, the film has a free shrink of at least about 50% in one direction. In a further embodiment, the film has a free shrink of at least about 60% in one direction. In still another embodiment, the film has a free shrink of at least about 70% in one direction. Here as elsewhere in the specification and claims, individually ranges may be combined to form additional or non-disclosed ranges. The film may have any of the forgoing shrink amounts in the machine and/or transverse directions at temperatures ranging from about 40 to about 90° C., or about 50 to about 70° C. For example, the film may have a free shrink at 80° C. in the transverse direction of at least about 60% and a free shrink at 60° C. in the machine direction of at most about 10%. Also, the film may have any combination of the forgoing shrink values at differing temperatures; for example, the film may have a free shrink at 90° C. in at least one direction of at least about 75% and a free shrink at 70° C. in any direction of at most about 5%. The film may be annealed, for example, to decrease the shrink attribute at a selected temperature (e.g., 70° C.).

The film may be annealed or heat-set to slightly or substantially reduce the free shrink of an oriented film, for example to raise the shrink initiation temperature. The film may have less than about any of 3%, 2%, and 1% free shrink in any direction at temperatures between 40 and 65° C. The free shrink of the film is determined by measuring the percent dimensional change in a 10×10 cm film specimen when subjected to selected heat (i.e., at a specified temperature exposure) according to ASTM D 2732, which is incorporated herein in its entirety by reference. All references to free shrink in this application are measured according to this standard. In one embodiment, the labels of the present invention may be prepared by co-extruding an upper skin layer, core layer and lower skin layer such as those described above.

The films have sufficient strength to be printed by flexographic and gravure printing. These films generally have a Young's modulus from about 150,000 to about 500,000, or from about 175,000 to about 400,000, or from about 200,000 to about 300,000 psi. Young's modulus is determined by ASTM D 882.

The film may have a printed image applied to it, for example, by any suitable ink printing method, such as rotary screen, gravure, or flexographic techniques. The printed image may be applied to a skin layer. The printed image may be applied as a reverse printed image, for example, applied to the inside layer of the film of a shrink film. This film is then printed by gravure printing and transfer laminated to a pressure sensitive adhesive on a release liner such as the silicone treated paper. In embodiments employing polyolefin skins, the skin(s) should be flame treated before being printable.

In one embodiment, the upper skin layer contains print indicia thereon. In one embodiment, the lower skin layer contains print indicia thereon. In one embodiment, the upper skin layer contains an adhesive layer thereon. In one embodiment, the lower skin layer contains an adhesive layer thereon. In one embodiment, the upper skin layer contains print indicia and an adhesive layer thereon. In one embodiment, the lower skin layer contains print indicia and an adhesive layer thereon.

The labels are particularly useful in encapsulating articles such as batteries. By way of illustration, the shrink film may be laminated to a pressure sensitive adhesive with liner. The film is die cut to form individual labels and the matrix surrounding the labels are removed. The resulting labels are then applied to a battery and then shrink wrapped in a heat tunnel. The temperature of the heat tunnel is approximately 250-260° F. The labels of the present invention encapsulate the battery as well without end puckering. When using these labels to encapsulate batteries, it is also understood that the labels may further include circuitry such as that used to determine the strength of the battery charge. Circuitry may be internal of the label, e.g., on the adhesive side of the label or on the outer surface of the label such as circuitry which would then be further covered with another film such as those described above, or a varnish to protect it from damage. Encapsulates for batteries and methods for encapsulating batteries along with description of some circuitry for battery labels is described in U.S. Pat. No. 5,190,609, issued to Lin et al. This patent in incorporated by reference for those teachings.

EXAMPLE

A three layer film is prepared by extruding a film having a sink/core/skin configuration where the skin layers are formed from a composition comprising 99% by weight PETG (Specter Clear available from Eastman) and 1% by weight of antiblock (Eastar 6763 C0235 available from Eastman), and the core layer is formed from a PETG (Specter Clear available from Eastman). The film is configured such that the core comprises 80% of the film and each skin layer is 10% of the film. The film is stretched in the machine direction at a ratio of 2.5:1. The film had the following properties:

| Property | Value |
| --- | --- |
| Modulus (MD) | 600 kpsi |
| Modulus (CD) | 170 kpsi |
| Tensile Strength (MD) | 161 psi |
| Tensile Strength (CD) | 6 kpsi |
| Elongation (MD) | 30% |
| Elongation (CD) | 250% |
| Tear Resistance (MD) | 12 gf/mil |
| Tear Resistance (CD) | 33 gf/mil |
| Stiffness (MD) | 2.4 mN |
| Stiffness (CD) | 2.9 mN |
| Haze | 1.1 |
| Gloss | >110 |
| Coefficient of Friction | <0.7 |
| Shrink (MD) | 57-65% |
| Shrink (CD) | (−4.0)-(−0.8)% |

While the invention has be described with reference to various exemplary embodiments, it will be appreciated that modifications may occur to those killed in the art, and the present application is intended to cover such modifications and inventions as fall within the spirit of the invention.

What is claimed is:

1. A multilayered shrink film comprising:
   a core layer consisting of a glycol modified polyester, the core layer having an upper and lower surface;
   an upper skin layer disposed on the upper surface of the core layer and a lower skin layer disposed on the lower surface of the core layer, the skin layers each individually comprising:
   (a) about 97.5 to about 99% by weight of a resin material; and
   (b) about 1 to about 2.5% by weight of an antiblocking agent;
   wherein the multilayered shrink film is not biaxially oriented;
   wherein a thickness ratio of the core layer to the skin layers combined is about 90:10; and
   wherein the resin material consists of a single polymer selected from the group consisting of a polyester, a glycol modified polyester, and a polyolefin;
   wherein the glycol modified polyesters of the core layer and of the resin material in the skin layers are derived from: (i) a dicarboxylic acid and a difunctional alcohol other than ethylene glycol; or (ii) a difunctional carboxylic acid and at least two difunctional alcohols, one of which is ethylene glycol;
   and wherein the shrink film has a shrink initiation temperature of about 45 to about 65° C. in a first direction.

2. The shrink film of claim 1, wherein the difunctional carboxylic acid is chosen from terephthalic acid, isophthalic acid, phthalic acid, 2,5-dimethylterephthalic acid, 5-t-butyl-isophthalic acid, 4,4'-biphenyldicarboxylic acid, trans-3,3'-stilbenedicarboxylic acid, trans-4,4'-stilbenedicarboxylic acid, 4,4'-dibenzyldicarboxylic acid, 1,4-naphthalenedicarboxylic acid, 1,5-naphthalenedicarboxylic acid, 2,3-naphthalenedicarboxylic acid, 2,6-naphthalenedicarboxylic acid, 2,7-naphthalenedicarboxylic acid, 2,2,6,6-tetramethylbiphenyl-4,4'-dicarboxylic acid, 1,1,3-trimethyl-3-phenylindene-4,5-dicarboxylic acid, 1,2-diphenoxyethane-4,4'-dicarboxylic acid, diphenyl ether dicarboxylic acid, 2,5-anthracenedicarboxylic acid, 2,5-pyridinedicarboxylic acid, or a combination of two or more thereof.

3. The shrink film of claim 1, wherein the difunctional alcohol or at least two difunctional alcohols are chosen from aliphatic diols, alicyclic diols, aromatic diols, or combinations of two or more thereof.

4. The shrink film of claim 3, wherein the difunctional alcohols is chosen from ethylene glycol, diethylene glycol, 1,2-propanediol, 1,3-propanediol, 1,3-butanediol, 1,4-butanediol, 1,5-pentanediol, 2,2-dimethyl-1,3-propanediol (neopentyl glycol), 1,6-hexanediol, 2-ethyl-2-methyl-1,3-propanediol, 2,2-diethyl-1,3-propanediol, 1,8-octanediol, 2-ethyl-2-butyl-1,3-propanediol, 2-ethyl-2,4-dimethyl-1,3-hexanediol, 1,10-decanediol, polyethylene glycol, polypropylene glycol, 1,2-cyclohexanedimethanol, 1,3-cyclohexanedimethanol, 1,4-cyclohexanedimethanol, 2,2,4,4-tetramethyl-1,3-cyclobutanediol, 2,2-bis(4'-β-hydroxyethoxydiphenyl)propane bis(4'-β-hydroxyethoxyphenyl)sulfone, xylylene glycol, and combinations of two or more thereof.

5. The shrink film of claim 4, wherein the glycol modified polyester is a glycol modified polyethylene terephthalate.

6. The shrink film of claim 5, wherein the glycol modified polyester comprises an alkylene glycol chosen from ethylene glycol, propylene glycol, butylene glycol, pentylene glycol, 1,6-hexanediol, 2,2-dimethyl-1,3-propanediol, or a combination of two or more thereof.

7. The shrink film of claim 1, wherein the antiblocking agent is chosen from diatomaceous earth, aluminum silicates, silicon dioxide, quarts, glass, silica sand, kaolin, talc, feldspar, calcium carbonate, gel-type synthetic silica, precipitated-type synthetic silica, sodium calcium aluminosilicate, calcium silicate, metal oxides of Group 2, 3, 4, 5, 13, or 14 metals, or combinations of two or more thereof.

8. The shrink film of claim 1, wherein the resin material of the skin layers is individually polylactic acid or a glycol modified polyethylene terephthalate material.

9. The shrink film of claim 1, having an upper skin:core: lower skin thickness ratio of about 5:90:5.

10. The shrink film of claim 1, wherein at least one of the upper skin layer and the lower skin layer comprises print indicia thereon.

11. The shrink film of claim 1, wherein at least one of the upper skin layer and the lower skin layer comprises an adhesive layer thereon.

12. The shrink film of claim 1, wherein the shrink film is oriented in the machine direction.

13. The shrink film of claim 12, wherein the orientation ratio is from about 1.1:1 to about 4:1.

14. The shrink film of claim 12, wherein the orientation is about 2:1 to about 3:1.

15. The shrink film of claim 1, wherein the film has a shrink initiation temperature of about 55 to about 65° C.

16. An article encapsulated with the shrink film of claim 1.

17. The article of claim 16, wherein the article is a battery.

18. The shrink film of claim 1, wherein the shrink film has a free shrink of at most about 5% 70° C. in a second different direction.

19. The shrink film of claim 1, wherein the shrink film has a free shrink of less than 3% at about 40° C. to about 65° C. in a second different direction as measured according to ASTM D2732.

20. The shrink film of claim 1, wherein the glass transition temperature (Tg) of the glycol modified polyester is from about 50° C. to about 100° C.

21. The shrink film of claim 1, wherein the shrink film is clear.

22. The shrink film of claim 1, wherein the resin material in at least one of the upper skin layer and the lower skin layer is polylactic acid.

23. The shrink film of claim 1, wherein the skin layers each individually consist of the resin material and the antiblocking agent.

24. The shrink film of claim 1, wherein the shrink film consists of the core layer, the upper skin layer, and the lower skin layer.

* * * * *